United States Patent
Xu et al.

(10) Patent No.: US 10,660,113 B2
(45) Date of Patent: May 19, 2020

(54) DATA TRANSMISSION METHOD AND APPARATUS

(71) Applicant: China Academy of Telecommunications Technology, Beijing (CN)

(72) Inventors: Fangli Xu, Beijing (CN); Wei Bao, Beijing (CN); Yan Wang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 97 days.

(21) Appl. No.: 15/518,242

(22) PCT Filed: Oct. 9, 2015

(86) PCT No.: PCT/CN2015/091586
§ 371 (c)(1),
(2) Date: Apr. 10, 2017

(87) PCT Pub. No.: WO2016/055023
PCT Pub. Date: Apr. 14, 2016

(65) Prior Publication Data
US 2017/0311339 A1    Oct. 26, 2017

(30) Foreign Application Priority Data
Oct. 10, 2014   (CN) .......................... 2014 1 0532529

(51) Int. Cl.
*H04W 72/12*   (2009.01)
*H04W 72/04*   (2009.01)
(Continued)

(52) U.S. Cl.
CPC ........... *H04W 72/12* (2013.01); *H04L 1/1822* (2013.01); *H04L 5/00* (2013.01); *H04W 16/00* (2013.01);
(Continued)

(58) Field of Classification Search
CPC ............................ H04W 72/12; H04L 1/1822
See application file for complete search history.

(56) References Cited

U.S. PATENT DOCUMENTS 9,258,792 B2 *  2/2016  Yeon ................. H04W 72/0413
2004/0147275 A1 *  7/2004  Dickson .............. H04W 52/221
455/522
(Continued)

FOREIGN PATENT DOCUMENTS

CN      102325382 A     1/2012
CN      103026653 A     4/2013
(Continued)

OTHER PUBLICATIONS

Intel Corporation: "Dual connectivity for UEs supporting one UL CC", 3GPP Draft; R2-131410. 3rd Generation Partnership Project (3GPP), Mobile Competence Centre; 650. Route Des Lucioles ; F-06921 Sophia-Antipolis Cedex; On Apr. 6, 2013, 8 pages.

*Primary Examiner* — Zhensheng Zhang
(74) *Attorney, Agent, or Firm* — Kilpatrick Townsend & Stockton, LLP

(57) ABSTRACT

Disclosed are a data transmission method and apparatus. In embodiments of this application, a virtual cell comprising multiple cells can be configured, and data transmission can be implemented by time-division multiplexing among the cells, so that transmission carriers for a terminal service can be flexibly adjusted. Particularly, under the condition that transmission is deployed on an unlicensed spectrum resource, multiple cells operating on an unlicensed frequency band are aggregated into one virtual cell, and data transmission is implemented by time-division multiplexing among the cells; therefore, the interference in different frequency domains can be reduced and the system transmission efficiency can be improved.

20 Claims, 5 Drawing Sheets

(51) Int. Cl.
  H04L 1/18     (2006.01)
  H04W 16/00    (2009.01)
  H04W 52/36    (2009.01)
  H04L 5/00     (2006.01)
  H04W 52/40    (2009.01)
  H04W 36/30    (2009.01)
  H04W 72/08    (2009.01)
  H04W 16/14    (2009.01)
  H04W 16/32    (2009.01)
  H04W 24/08    (2009.01)
  H04W 36/00    (2009.01)

(52) U.S. Cl.
  CPC ......... *H04W 36/30* (2013.01); *H04W 52/365* (2013.01); *H04W 52/40* (2013.01); *H04W 72/0446* (2013.01); *H04W 72/08* (2013.01); *H04W 72/1226* (2013.01); *H04W 16/14* (2013.01); *H04W 16/32* (2013.01); *H04W 24/08* (2013.01); *H04W 36/0055* (2013.01)

(56) References Cited

U.S. PATENT DOCUMENTS

| | | | |
|---|---|---|---|
| 2010/0099428 A1* | 4/2010 | Bhushan | H04J 11/0059 455/452.1 |
| 2012/0015653 A1* | 1/2012 | Paliwal | H04W 24/10 455/435.1 |
| 2012/0307869 A1 | 12/2012 | Charbit et al. | |
| 2013/0165134 A1 | 6/2013 | Touag et al. | |
| 2014/0105050 A1 | 4/2014 | Kang et al. | |
| 2014/0226551 A1* | 8/2014 | Ouchi | H04W 52/04 370/311 |
| 2014/0226570 A1 | 8/2014 | Comeau et al. | |
| 2015/0223243 A1* | 8/2015 | Tabet | H04W 28/085 370/330 |
| 2015/0249980 A1* | 9/2015 | You | H04L 1/1861 370/329 |
| 2015/0373550 A1* | 12/2015 | Hong | H04W 72/0446 370/254 |
| 2016/0050706 A1 | 2/2016 | Zhang et al. | |

FOREIGN PATENT DOCUMENTS

| | | | |
|---|---|---|---|
| CN | 103444219 A | 12/2013 | |
| CN | 103781093 A | 5/2014 | |
| EP | 2164270 A1 | 3/2010 | |
| WO | 2008125147 A1 | 10/2008 | |
| WO | 2014012192 A1 | 1/2014 | |
| WO | 2014043863 A1 | 3/2014 | |
| WO | 2014126445 A1 | 8/2014 | |
| WO | 2014163690 A1 | 10/2014 | |
| WO | WO-2015167250 A1 * | 11/2015 | ............ H04L 5/001 |

* cited by examiner

DATA TRANSMISSION METHOD AND APPARATUS

This application is a US National Stage of International Application No. PCT/CN2015/091586, filed on Oct. 9, 2015, designating the United States, and claiming priority to Chinese Patent Application No. 201410532529.8, filed with the Chinese Patent Office on Oct. 10, 2014 and entitled "Data Transmission Method and Apparatus". The entire application of the above application is incorporated herein by reference.

FIELD

The present application relates to the field of communication technology, and particularly to a data transmission method and apparatus.

BACKGROUND

Peak rate of the Long Term Evolution Advanced (LTE-A) system is much bigger than peak rate of the Long Term Evolution (LTE), required to be 1 Gbps for downlink and 500 Mbps for uplink. Also, the LTE-A system requires good compatibility with the LTE system. Based on the need to raise peak rate, to be compatible with the LTE system and to make full use of spectrum resources, the LTE-A system introduced Carrier Aggregation (CA) technology.

The carrier aggregation technology is: user equipment could work in multiple cells simultaneously, and one cell includes a pair of uplink (UL)/downlink (DL) component carriers (CC). Each component carrier of a carrier aggregation system could be continuous or discrete; the bandwidth of each component carrier could be the same or different; and in order to be compatible with the LTE system, the largest bandwidth of each component carrier is limited to 20 MHz. Carrier aggregation cells of the LTE-A system are divided into primary cells (PCell) and secondary cells (SCell). Only one of the cells aggregated by the user equipments (UE) is defined as the PCell, while all the other cells are defined as SCell.

With rapid development of wireless communications, demands for spectrum resources are growing. Since the mobile data traffic continues to grow, the existing licensed spectrum resources can't fully meet the needs of users, transmission deployment on unlicensed spectrum resources in the LTE system are considered.

SUMMARY

The embodiments of the application provide a data transmission method and an apparatus, in order to transmit data by time-division multiplexing among multiple cells.

Embodiments of the application provides a data transmission method, including:

Obtaining, by a terminal, the configuration information of a virtual cell, wherein the virtual cell comprises N cells, and N≥1;

Transmitting, by the terminal, data by time-division multiplexing among the N cells.

Preferably, the method further includes:

Receiving, by the terminal, configuration information of time-division multiplexing, wherein the configuration information of time-division multiplexing indicates time segment each cell occupies when the terminal transmits data among the N cells, and in each time segment the terminal is instructed to transmit data in only one of the N cells.

Transmitting, by the terminal, data by time-division multiplexing among the N cells, includes:

Transmitting, by the terminal, data by time-division multiplexing among the N cells according to the configuration information of time-division multiplexing.

Preferably, transmitting by the terminal data by time-division multiplexing among the N cell(s), includes:

Receiving, by the terminal, cell handover indication information sent by a network device; and Switching, by the terminal, from a source cell which the terminal is currently operating in to a target cell indicated by the cell handover indication information to transmit data, according to the cell handover indication information, wherein the source cell and the target cell are cells of the N cells.

Preferably, the method further includes:

Maintaining, by the terminal, a set of uplink and downlink timing relationship information of the virtual cell.

Transmitting, by the terminal, data by time-division multiplexing among the N cells, comprises:

Transmitting, by the terminal, data by time-division multiplexing and according to the uplink and downlink timing relationship information among the N cells.

Preferably, the method further includes:

Feeding back, by the terminal, information of data reception situation in the N cells to the network device; and Receiving, by the terminal, data resent by the network device according to the information of data reception situation, wherein the resent data is transmitted among the N cells by time-division multiplexing.

Preferably, the method further includes:

Detecting, by the terminal, a physical downlink control channel (PDCCH) in each of the N cells, and detecting a physical downlink shared channel (PDSCH) in the same cell according to detected PDCCH, wherein the PDCCH in each of the N cells is configured to schedule resource transmitted in the cell; or Detecting, by the terminal, the PDCCH in a cell outside the virtual cells, and detecting the PDSCH in one or multiple cells of the N cells according to detected PDCCH, wherein the PDCCH in a cell outside the virtual cells is configured to schedule the resource transmitted in one or multiple cells of the virtual cells.

Preferably, the method also includes:

Performing, by the terminal, power measurement on the virtual cells according to a power control parameter configured for the virtual cell and performing power headroom report (PHR) for the virtual cell according to the power measurement result; or Performing, by the terminal, power measurement on each of the N cells respectively, according to a power control parameter respectively configured for each of the N cells of the virtual cell, and performing PHR for each of the N cells according to the power measurement results, respectively.

Preferably, the method includes:

Performing, by the terminal, measurement on the N cells comprised in the virtual cells at the same time; or Performing, by the terminal, measurement on the N cells comprised in the virtual cells by time-division multiplexing, wherein measurement is performed on only one of the N cells in every time segment.

Preferably, the method includes:

after having obtained the measurement result via the measurement, reporting, by the terminal, the measurement result of each of the N cells.

Preferably, the method includes:

when the virtual cell configured for the terminal is deactivated or its discontinuous reception is off, stopping, by the terminal, transmitting data among the N cells by time-division multiplexing; and when the virtual cell configured for the terminal is activated again or its discontinuous reception is on, continuing to transmit, by the terminal, data among the N cells by time-division multiplexing.

Preferably, there is one or multiple virtual cells; and when there are multiple virtual cells, a cell is allowed to be configured into multiple virtual cells, and its configurations for time-division multiplexing in the multiple virtual cells are the same.

Preferably, obtaining, by the terminal, the configuration information of virtual cell, wherein the virtual cell comprises N cells, includes:

obtaining, by the terminal, configuration information of carrier aggregation configured for the terminal, wherein the configuration information of carrier aggregation comprises configuration information of a primary cell and configuration information of a secondary cell, the configuration information of the secondary cell comprises configuration information of at least one virtual cell, and the virtual cell comprises N cells operating at non-licensed band.

Embodiments of the present application provides another data transmission method, the method including:

Configuring, by a network device, a virtual cell for a terminal, wherein the virtual cell comprises N cells, and N≥1;

Transmitting, by the network device, data with the terminal by time-division multiplexing among the N cells comprised in the virtual cell.

Preferably, the method further includes:

Transmitting, by the network device, to the terminal configuration information of time-division multiplexing, wherein the configuration information of time-division multiplexing indicates time segment each cell occupies when the terminal transmits data among the N cells, and in each time segment the terminal is instructed to transmit data in one of the N cells.

Transmitting, by the network device, data with the terminal by time-division multiplexing among the N cells comprised in the virtual cell, includes:

Transmitting, by the network device, according to the configuration information of time-division multiplexing, data with the terminal by time-division multiplexing among the N cells.

Preferably, transmitting, by the network device, data with the terminal by time-division multiplexing among the N cells comprised in the virtual cell, includes:

Transmitting, by the network device, cell handover indication information to the terminal, so that the terminal, according to the cell handover indication information, switches from a source cell which the terminal is currently operating in to a target cell indicated by the cell handover indication information to transmit data, wherein the source cell and the target cell are cells of the N cells.

Preferably, transmitting, by the network device, data with the terminal by time-division multiplexing among the N cells comprised in the virtual cell, includes:

Transmitting, by the network device, data with the terminal by time-division multiplexing among the N cells according to a set of uplink and downlink timing relationship information of the virtual cell maintained by the network device.

Preferably, the method further includes:

Receiving, by the network device, information of data reception situation in the N cells fed back by the terminal; and Re-transmitting, by the network device, data to the terminal according to the information of data reception situation, wherein the re-transmitted data is transmitted among the N cells by time-division multiplexing.

Preferably, the method further includes:

Receiving, by the network device, power headroom reported by the terminal according to a power control parameter of the virtual cell, and performing power control on each cell comprised in the virtual cell according to the power headroom; or Receiving, by the network device, power headroom of each cell reported by the terminal according to a power control parameter of each cell comprised in the virtual cell, and performing power control on each cell according to the cell's power headroom.

Preferably, the method further includes:

Transmitting, by the network device, to the terminal an indication of deactivation or discontinuous reception-off (DRX off) of the virtual cell to instruct the terminal to stop transmitting data by time-division multiplexing among the N cells; and Transmitting, by the network device, to the terminal an indication of re-activation or discontinuous reception-on (DRX on) of the virtual cell to instruct the terminal to continue to transmit data among the N cell(s) by time-division multiplexing.

Preferably, there is one or multiple virtual cells; and when there are multiple virtual cells, a cell is allowed to be configured into multiple virtual cells, and its configurations for time-division multiplexing in the multiple virtual cells are the same.

Preferably, configuring, by the network device, configuration information of the virtual cell for the terminal, includes:

configuring, by the network device, configuration information of carrier aggregation for the terminal, wherein the configuration information of carrier aggregation comprises configuration information of a primary cell and configuration information of a secondary cell, the configuration information of the secondary cell comprises configuration information of at least one virtual cell, and the virtual cell comprises N cells operating at non-licensed band.

Embodiments of the present application provides a terminal, where the terminal includes:

an obtaining module, configured to obtain configuration information of a virtual cell, wherein the virtual cell comprises N cells, N≥1; and a transmission module, configured to transmit data by time-division multiplexing among the N cells.

Preferably, the transmission module is further configured to:

receive configuration information of time-division multiplexing, wherein the configuration information of time-division multiplexing indicates time segment each cell occupies when the terminal transmits data among the N cells, and in each time segment the terminal is instructed to transmit data in one of the N cells; and transmit data by time-division multiplexing among the N cells according to the configuration information of time-division multiplexing.

Preferably, the transmission module is further configured to:

receive cell handover indication information sent by a network device; and switch from a source cell which the terminal is currently operating in to a target cell indicated by the cell handover indication information to transmit data, according to the cell handover indication information, where the source cell and the target cell are cells of the N cells.

Preferably, the transmission module is further configured to:

maintain a set of uplink and downlink timing relationship information of the virtual cell; and transmit data by time-division multiplexing and according to the uplink and downlink timing relationship information among the N cells.

Preferably, the transmission module is further configured to:

feed back information of data reception situation in the N cells to the network device; and receive data resent by the network device according to the information of data reception situation, wherein the resent data is transmitted among the N cells by time-division multiplexing.

Preferably, the terminal also includes:

a detection module, configured to detect a PDCCH in each of the N cells, and detect a PDSCH in a same cell according to detected PDCCH, wherein the PDCCH in each of the N cells is configured to schedule the resource transmitted in the cell; or detect the PDCCH in a cell outside the virtual cells, and detect the PDSCH in one or multiple cells of the N cells according to detected PDCCH, wherein the PDCCH in a cell outside the virtual cells is configured to schedule the resource transmitted in one or multiple cells of the virtual cell.

Preferably, the terminal further includes:

a measurement module, configured to perform power measurement on the virtual cell according to a power control parameter configured for the virtual cell and perform PHR of the virtual cell according to the power measurement result; or perform power measurement on each of the N cells respectively, according to a power control parameter respectively configured for each of the N cells of the virtual cell, and perform PHR of each of the N cells according to the power measurement result, respectively.

Preferably, the terminal further includes:

a measurement module, configured to perform measurement on the N cells comprised in the virtual cell at the same time; or perform measurement on the N cells comprised in the virtual cell by time-division multiplexing, wherein measurement is performed on one of the N cells in every time segment.

Preferably, the transmission module is further configured to:

report the measurement result of each of the N cells.

Preferably, the transmission module is further configured to:

when the virtual cell configured for the terminal is deactivated or its discontinuous reception is off, stop transmitting data among the N cells by time-division multiplexing; and when the virtual cell configured for the terminal is activated again or its discontinuous reception is on, continue to transmit data among the N cells by time-division multiplexing.

Preferably, there is one or multiple virtual cells; and when there are multiple virtual cells, a cell is allowed to be configured into multiple virtual cells, and its configurations for time-division multiplexing in the multiple virtual cells are the same.

Preferably, the obtaining module is further configured to:

obtain configuration information of carrier aggregation configured for the terminal, wherein the configuration information of carrier aggregation comprises configuration information of primary cell and configuration information of secondary cell, the configuration information of secondary cell comprises configuration information of at least one virtual cell, and the virtual cell comprises N cells operating at non-licensed band.

Embodiments of the present application provides a network device, the network device including:

a configuration module, configured to configure a virtual cell for a terminal, wherein the virtual cell comprises N cells, and N≥1; and a transmission module, configured to transmit data with the terminal by time-division multiplexing among the N cells comprised in the virtual cell.

Preferably, the transmission module is further configured to:

transmit to the terminal configuration information of time-division multiplexing, wherein the configuration information of time-division multiplexing indicates time segment each cell occupies when the terminal transmits data among the N cells, and in each time segment the terminal is instructed to transmit data in one of the N cells; and according to the configuration information of time-division multiplexing, transmit data with the terminal by time-division multiplexing among the N cells.

Preferably, the transmission module is further configured to:

transmit cell handover indication information to the terminal, so that the terminal, according to the cell handover indication information, switches from a source cell which the terminal is currently operating in to a target cell indicated by the cell handover indication information to transmit data, wherein the source cell and the target cell are cells of the N cells.

Preferably, the transmission module is further configured to:

transmit data with the terminal by time-division multiplexing among the N cells according to a set of uplink and downlink timing relationship information of the virtual cell maintained by the terminal.

Preferably, the transmission module is further configured to:

receive information of data reception situation in the N cells fed back by the terminal; and re-transmit data to the terminal according to the information of data reception situation, wherein the re-transmitted data is transmitted among the N cells by time-division multiplexing.

Preferably, the transmission module is further configured to:

receive power headroom reported by the terminal according to a power control parameter of the virtual cells, and perform power control on each cell comprised in the virtual cell according to the power headroom; or receive power headroom of each cell reported by the terminal according to a power control parameter of each cell comprised in the virtual cells, and perform power control on each cell according to the cell's power headroom.

Preferably, the transmission module is further configured to:

transmit to the terminal an indication of deactivation or discontinuous reception-off (DRX off) of the virtual cell to instruct the terminal to stop transmitting data by time-division multiplexing among the N cells; and transmit to the terminal an indication of re-activation or discontinuous reception-on (DRX on) of the virtual cell to instruct the terminal to continue to transmit data among the N cells by time-division multiplexing.

Preferably, there is one or multiple virtual cells; and when there are multiple virtual cells, a cell is allowed to be configured into multiple virtual cells, and its configurations for time-division multiplexing in the multiple virtual cells are the same.

Preferably, the configuration module is further configured to:

configure configuration information of carrier aggregation for the terminal, wherein the configuration information of carrier aggregation comprises configuration information of a primary cell and configuration information of a secondary cell, the configuration information of the secondary cell comprises configuration information of at least one virtual cell, and the virtual cell comprises N cells operating at non-licensed band.

Embodiments of the present application provide another terminal, the terminal including a transceiver, and at least one processor connected with the transceiver, where the processor is configured to read instructions in a memory to perform the following operations:

obtaining configuration information of a virtual cell, where the virtual cell includes N cells, N≥1; and controlling the transceiver to transmit data by time-division multiplexing among the N cells.

Preferably, the transceiver is further configured to:

receive configuration information of time-division multiplexing, where the configuration information of time-division multiplexing indicates time segment each cell occupies when the terminal transmits data among the N cells, and in each time segment the terminal is instructed to transmit data in only one of the N cells.

Preferably, the transceiver is further configured to: receive cell handover indication information sent by a network device; and the processer is further configured to perform the following operation: switching from a source cell which the terminal is currently operating in to a target cell indicated by the cell handover indication information to transmit data, according to the cell handover indication information, where the source cell and the target cell are cells of the N cells.

Preferably, the processor is further configured to perform the following operations:

maintaining a set of uplink and downlink timing relationship information of the virtual cell; and controlling the transceiver to transmit data by time-division multiplexing and according to the uplink and downlink timing relationship information among the N cells.

Preferably, the processor is further configured to perform operation of controlling the transceiver to feed back information of data reception situation in the N cells to the network device.

The transceiver is further configured to receive data resent by the network device according to the information of data reception situation, where the resent data is transmitted among the N cells by time-division multiplexing.

Preferably, the processor is further configured to perform the following operations:

detecting a PDCCH in each of the N cells, and detecting a PDSCH in a same cell according to detected PDCCH, where the PDCCH in each of the N cells is configured to schedule the resource transmitted in the cell; or detecting the PDCCH in a cell outside the virtual cell, and detecting the PDSCH in one or multiple cells of the N cells according to detected PDCCH, where the PDCCH in a cell outside the virtual cell is configured to schedule the resource transmitted in one or multiple cells of the virtual cell.

Preferably, the processor is further configured to perform the following operations:

performing power measurement on the virtual cell according to a power control parameter configured for the virtual cell and performing power headroom report (PHR) for the virtual cell according to the power measurement result; or performing power measurement on each of the N cells respectively, according to a power control parameter respectively configured for each of the N cells of the virtual cell, and performing PHR for each of the N cells according to the power measurement result, respectively.

Preferably, the processor is further configured to perform the following operation:

performing measurement on the N cells included in the virtual cell at the same time; or performing measurement on the N cells included in the virtual cell by time-division multiplexing, where measurement is performed on one of the N cells in every time segment.

Preferably, the processor is further configured to perform the following operation:

after having obtained the measurement result, controlling the transceiver to report the measurement result of each of the N cells.

Preferably, the processor is further configured to perform the following operations:

when the virtual cell configured for the terminal is deactivated or its discontinuous reception is off, controlling the transceiver to stop transmitting data among the N cells by time-division multiplexing; and when the virtual cell configured for the terminal is activated again or its discontinuous reception is on, controlling the transceiver to continue to transmit data among the N cells by time-division multiplexing.

Preferably, there is one or multiple virtual cells; and when there are multiple virtual cells, a cell is allowed to be configured into multiple virtual cells, and its configurations for time-division multiplexing in the multiple virtual cells are the same.

Based on any of the abovementioned embodiments, the processor is further configured to perform the following operation:

obtaining configuration information of carrier aggregation configured for the terminal, where the configuration information of carrier aggregation includes configuration information of a primary cell and configuration information of a secondary cell, the configuration information of the secondary cell includes configuration information of at least one virtual cell, and the virtual cell includes N cells operating at non-licensed band.

Embodiments of the present application provides another network device, the network device including: a transceiver, and at least one processor connected with the transceiver, where the processor is configured to read instructions in a memory and perform the following operations:

configuring a virtual cell for a terminal, where the virtual cell includes N cells, and N≥1; and controlling the transceiver to transmit data with the terminal by time-division multiplexing among the N cells included in the virtual cell.

Preferably, the processor is further configured to perform the following operation:

controlling the transceiver to transmit to the terminal configuration information of time-division multiplexing, where the configuration information of time-division multiplexing indicates time segment each cell occupies when the terminal transmits data among the N cells, and in each time segment the terminal is instructed to transmit data in only one of the N cells.

Preferably, the processor is further configured to perform the following operation:

controlling the transceiver to transmit cell handover indication information to the terminal, so that the terminal, according to the cell handover indication information, switches from a source cell which the terminal is currently operating in to a target cell indicated by the cell handover indication information to transmit data, where the source cell and the target cell are cells of the N cells.

Preferably, the processor is further configured to perform the following operation:

controlling the transceiver to transmit data with the terminal by time-division multiplexing among the N cells according to a set of uplink and downlink timing relationship information of the virtual cell maintained by the terminal.

Preferably, the transceiver is further configured to receive information of data reception situation in the N cells fed back by the terminal; and the processor is further configured to perform the following operation: re-transmitting data to the terminal according to the information of data reception situation, where the re-transmitted data is transmitted among the N cells by time-division multiplexing.

Preferably, the transceiver is further configured to receive power headroom reported by the terminal according to a power control parameter of the virtual cell and the processor is further configured to perform power control on each cell included in the virtual cell according to the power headroom; or, the transceiver is further configured to receive a power headroom of each cell reported by the terminal according to a power control parameter of each cell included in the virtual cell, and the processor is further configured to perform power control on each cell according to the cell's power headroom.

Preferably, the transceiver is further configured to:

receive measurement result of each of the N cells reported by the terminal;

where the measurement results are obtained by the terminal performing measurement on the N cells included in the virtual cell at the same time; or the measurement results are obtained by the terminal performing measurement on the N cells included in the virtual cells through time-division multiplexing.

Preferably, the processor is further configured to perform the following operations:

controlling the transceiver to transmit to the terminal an indication of deactivation or discontinuous reception-off (DRX off) of the virtual cell to instruct the terminal to stop transmitting data by time-division multiplexing among the N cells; and controlling the transceiver to transmit to the terminal an indication of re-activation or discontinuous reception-on (DRX on) of the virtual cell to instruct the terminal to continue to transmit data among the N cells by time-division multiplexing.

Preferably, there is one or multiple virtual cells; and when there are multiple virtual cells, a cell is allowed to be configured into multiple virtual cells, and its configurations for time-division multiplexing in the multiple virtual cells are the same.

Based on any one of the abovementioned embodiments, the processor is further configured to perform the following operation:

configuring configuration information of carrier aggregation for the terminal, where the configuration information of carrier aggregation includes configuration information of a primary cell and configuration information of a secondary cell, the configuration information of the secondary cell includes configuration information of at least one virtual cell, and the virtual cell includes N cells operating at non-licensed band.

According to the embodiments of the present application mentioned above, because virtual cell including multiple cells could be configured, also data transmission is performed by time-division multiplexing among the multiple cells, transmission carriers of terminal service could be adjusted flexibly. In particular, in situations where transmission is implemented on unlicensed spectrum resources, multiple cells operating at unlicensed band are aggregated into a virtual cell, and data transmission is performed among the multiple cells by time-division multiplexing, thus reducing interferences between different frequency domains and improving transmission efficiency of the system.

DETAILED DESCRIPTION

To make the purposes, technical solutions and advantages of the present application clearer, embodiments of the present application will now be described with reference to the accompanying drawings, and obviously the embodiments described are only part of the embodiments of the present application, not all the embodiments. Based on the embodiments of the present application, all the other embodiments obtained by those of ordinary skill in the art without making creative work are within the scope of the present application.

Figure 1:
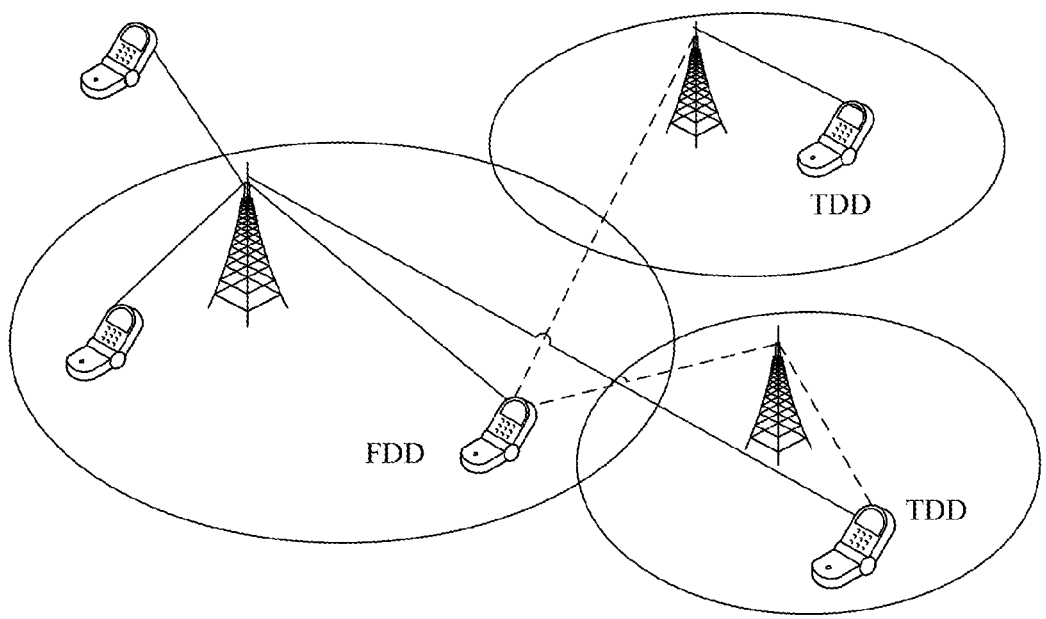
FIG. 1 is a schematic architectural diagram of a system applicable to embodiments of the application.

FIG. 1 is a schematic architectural diagram of a system applicable to embodiments of the present application. The system architecture includes network device(s), and at least one terminal, where the network device(s) could be base station(s) and the terminal could be a mobile device with wireless communication function, such as a mobile phone.

Figure 2:
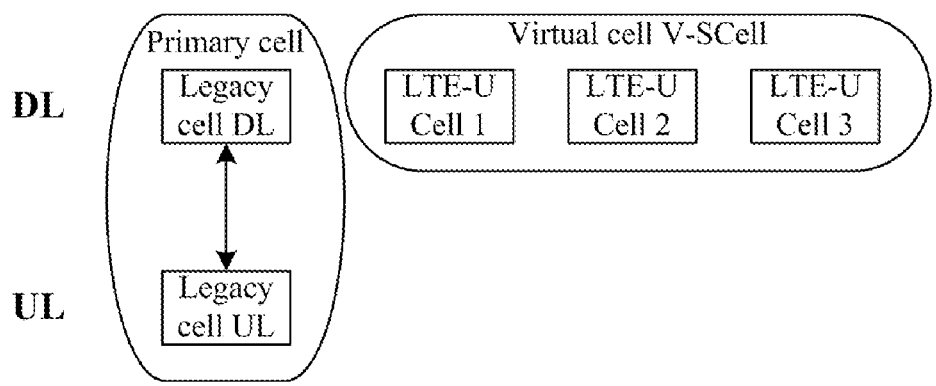
FIG. 2 is a schematic diagram of a model where a virtual cell is a secondary cell, where LTE-U is in frequency division duplexing (FDD) mode.
Figure 3:
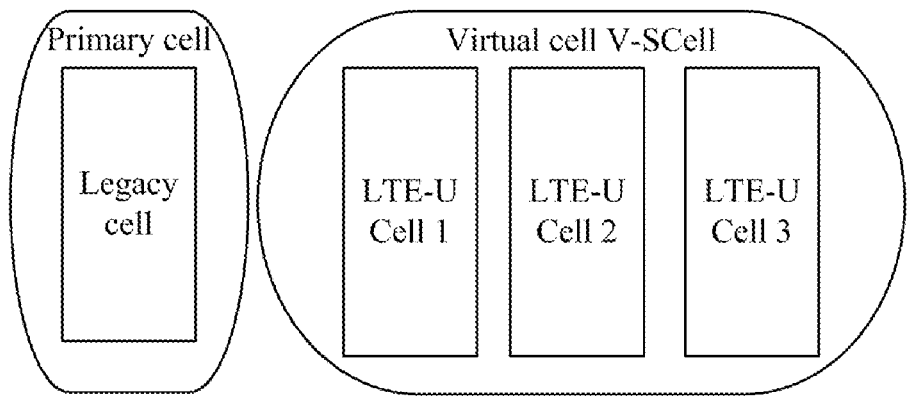
FIG. 3 is a schematic diagram of another model where a virtual cell is a secondary cell, where LTE-U is in time division duplexing (TDD) mode.

In embodiments of the present application, a network device could configure virtual cell(s) for a terminal, where the virtual cell(s) includes N cell(s) (N≥1). FIG. 2 is a schematic diagram of a model where a virtual cell is a secondary cell and the LTE-U is of FDD type. FIG. 3 is a schematic diagram of another model where a virtual cell is a secondary cell and the LTE-U is of TDD type. The network device and the terminal could transmit data by time-division multiplexing among the N cell(s) included in the virtual cell(s).

Based on said architecture, embodiments of the present application provides a data transmission method at both network side and terminal side, respectively, where the transmission method at network side and the transmission method at terminal side could be used independently or be used in combination. Data transmission methods at network side and terminal side are described below, respectively.

Figure 4:
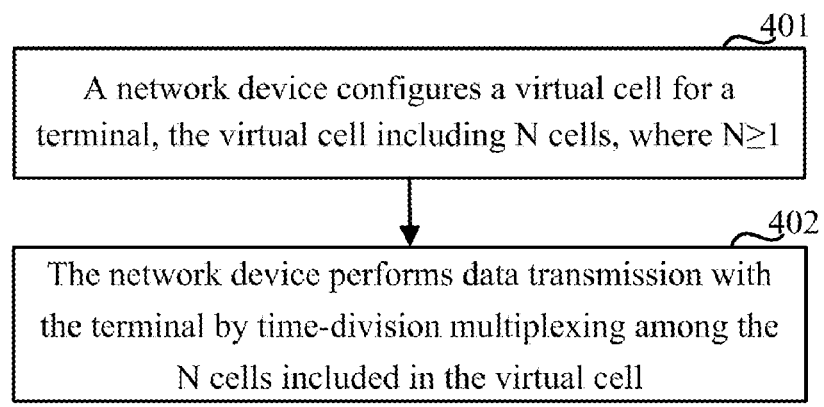
FIG. 4 is a flow chart of data transmission at the network side according to embodiments of the application.

FIG. 4 is a flow chart of data transmission according to embodiments of the present application, which illustrates the process flow on the network side and includes the step 401 and the step 402.

Step 401: a network device configures virtual cell(s) for a terminal, the virtual cell(s) including N cell(s), where N≥1;

Step 402: the network device performs data transmission with the terminal by time-division multiplexing among the N cell(s) included in the virtual cell(s).

There could be one or multiple virtual cells, where multiple herein means two or more than two. When there are multiple virtual cells, a cell is permitted to be configured into multiple virtual cells, where configurations of time-division multiplexing keep the same in the multiple virtual cells. For example, virtual cells configured for the terminal by the network device includes virtual cell 1 and virtual cell 2; a real cell LTE-U1 could belong to the virtual cell 1 and the virtual cell 2 at the same time, in which case, transmission time segment allocated for LTE-U1's in the virtual cell 1 equals to that in the virtual cell 2, where a LTE-U cell refers to a cell operating at unlicensed band(s).

Moreover, the network device could dynamically change the cell sets included in virtual cell(s), according to changes of measurement condition or interference condition of a cell, such as deleting a cell from the virtual cell(s) or adding a cell into the virtual cell(s). After the network device has updated virtual cell(s), it could transmit the configuration information of the virtual cell(s) to the terminal via radio resource control (RRC) signaling.

Virtual cell(s) in the flow above means a set of N cell(s). Take the LTE system as an example. In the step 401, when the network device configures virtual cell(s) for the terminal, it could aggregate multiple cells operating at licensed band(s) of the LTE system into a virtual cell, or aggregate some cells operating at licensed band(s) of the LTE system and some cells operating at unlicensed band(s) of the LTE system into a virtual cell, or aggregate multiple cells operating at unlicensed band(s) of the LTE system into a virtual cell.

For example, the network device could adopt carrier aggregation technology to configure configuration information of carrier aggregation for a terminal, and transmits the configuration information of carrier aggregation to the terminal. The configuration information of carrier aggregation includes configuration information of primary cell, such as the frequency where the primary cell is at, and configuration information of secondary cell. The configuration information of secondary cell includes configuration information of one or multiple virtual cells. A virtual cell, as mentioned above, could include N cell(s), and the virtual cell's configuration information could include frequencies of the N cell(s). The frequencies of the N cell(s) could be at unlicensed band(s) of the LTE system, that is, the N cell(s) could be cells operating at unlicensed band(s) of the LTE system.

Since unlicensed spectrum resources could be shared by multiple systems, for example, another network such as a wireless-fidelity (Wi-Fi) network could be deployed together with an LTE network, interference of the LTE system on unlicensed spectrum resources is quite unstable. According to embodiments of the present application, N cell(s) operating at unlicensed band(s) of the LTE system into virtual cell(s) are aggregated, and data are transmitted by time-division multiplexing among the N cell(s), thus a UE service transmission carrier can be adjusted flexibly, avoiding interference in different frequency domains without affecting the UE's service transmission, thus making full use of unlicensed spectrum resources and improving transmission performance of the LTE system on unlicensed spectrum resources.

To perform data transmission with the terminal by time-division multiplexing among the N cell(s) included in the virtual cell(s), the network device needs to inform the terminal of the configuration for time-division multiplexing, therefore, embodiments of the present application provides the following two methods (method 1 and method 2).

Method 1: Static Notification Method

With this method, the network device transmits configuration information of time-division multiplexing to the terminal, where the configuration information of time-division multiplexing indicates time segment each cell occupies when the terminal transmits data in the N cell(s), where in each time segment the terminal is instructed to transmit data only in one of the N cell(s), in order to realize transmission between the network device and the terminal by time-division multiplexing among the N cell(s).

The configuration information of time-division multiplexing could be determined by the network device or be negotiated by network devices. For example, in a scenario where multiple LTE-U cells are carrier-aggregated into a virtual cell to provide service for the terminal, an LTE-U base station may negotiate with a surrounding LTE-U base station or a wireless local area network access point (WLAN AP) to obtain information about interference each cell suffers, and then determine the configuration information of time-division multiplexing for data transmission in these cells. Another example is that, when a legacy cell and an LTE-U cell collaborates to provide services for the terminal, the base station of one of these cells would determine the configuration information of time-division multiplexing of the virtual cell, where the base station could notify the terminal of the configuration information of time-division multiplexing via dedicated signaling.

Figure 5:
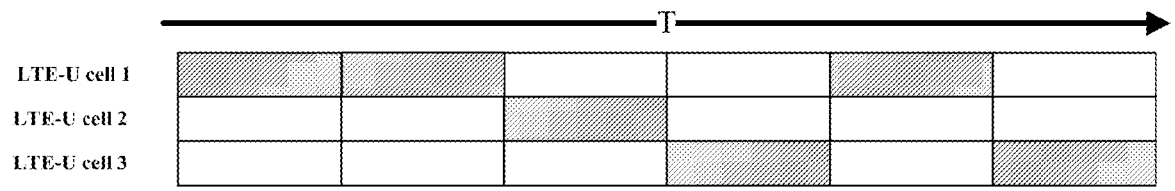
FIG. 5 is a schematic diagram of data transmission in a virtual cell according to embodiments of the application.

The configuration information of time-division multiplexing could be represented by a TDM pattern, where the TDM pattern is a bitmap whose length is N bits and each bit corresponds to a cell or a frequency of the cell of the N cell(s). When the value of a certain bit is 0, it means data is transmitted in the corresponding cell; and when the value of a certain bit is 1, it means data is not transmitted in the corresponding cell. The time length of data transmission in each cell is the same, and vice versa. The terminal could be handed over among the N cell(s) according to the TDM pattern, thus transmitting data with the network device among the N cell(s) by time-division multiplexing is allowed. FIG. 5 is a schematic diagram of data transmission in virtual cell(s) according to embodiments disclosed herein, where specifically, the terminal transmits data with the network device by time-division multiplexing among the N cell(s).

The configuration information of time-division multiplexing is transmitted by the network device to the terminal via a dedicated signaling, where the dedicated signaling could carry the abovementioned TDM pattern. The dedicated signaling could be L1 signaling (data link level signaling), L2 signaling (link function level signaling) or L3 signaling (network function level signaling). For example, the dedicated signaling could be the RRC signaling.

The configuration information of time-division multiplexing is suitable for one or multiple scheduling cycles.

With the static notification method, the network device could send complete configuration information of time-division multiplexing to the terminal; and the network device could transmit data with the terminal by time-division multiplexing among the N cell(s), based on the complete configuration information of time-division multiplexing.

Method 2: Dynamic Notification Method

With this method, the network device transmits cell handover indication information to the terminal, so that the terminal switches from a source cell which the terminal is currently operating in to a target cell indicated by the cell handover indication information to transmit data, according to the cell handover indication information, where the source cell and the target cell are cells of the N cell(s).

Specifically, with this method, the network device judges by itself the handover timing of data transmission among the N cell(s), that is, the configuration information of time-division multiplexing is not completely obtained in advance, but is dynamically determined by the network device according to the data transmission situation. For example, an LTE-U base station could determine the handover timing of data transmission among the N cell(s) according to interference condition of the respective cells, and notify the terminal via control signaling so that the terminal could switch to the target cell to transmit data. The control signaling could be L1 signaling or L2 signaling. The interference of each cell could be obtained on the basis of the terminal's measurement report, or on the basis of the network device's own measurement.

It requires time delay when the terminal is handed over between two cells. Considering factors such as handover time-delay, frequency handover time, and service interruption time, in a preferred embodiment, the network device could inform a terminal of a handover in time t's advance; moreover, it could then notify the terminal of the handover's time, where t represents the length of time left before the handover, so that the network device and the terminal could switch into the target cell at the same time to transmit data.

With the dynamic notification method above, the network device could flexibly select a cell whose interference is small to provide service transmission for the terminal according to data transmission situation.

Embodiments of the present application have improved the mechanism of measurement configuration and terminal measurement report, on the basis of the configuration of the virtual cell(s).

When the network device performs measurement configuration on the terminal, it could perform the measurement configuration with respect to the virtual cell(s), that is, it performs the measurement configuration in unit of virtual cell. A measurement parameter configured with respect to the virtual cell applies to every cell of the virtual cell.

The network device could perform measurement configuration with respect to every cell of the virtual cell respectively, that is, the measurement configuration is performed in unit of every cell of the virtual cell. A measurement configuration parameter configured with respect to every cell of virtual cell could be either the same or different.

Correspondingly, the terminal performs measurement and reporting according to measurement configuration.

In addition, the network device could configure a measurement pattern for the terminal, where the measurement pattern indicates a time segment that the measurement of each cell of the virtual cell occupies. The measurement pattern and the time-division multiplexing pattern could be either the same or different, and if the same, the terminal could perform measurement at the current service reception cell.

The measurement pattern could instruct the terminal to perform measurement on multiple cells of the virtual cell, and even instruct the terminal to perform measurement on all cells of the virtual cell, which applies to a scenario where the terminal has a large enough operating bandwidth. The measurement pattern could also instruct to perform measurement among multiple cells of the virtual cell by time-division multiplexing, where the measurement time segments of the respective cells don't overlap with each other, that is, at one moment only one cell is measured, which applies to a scenario where the terminal could only work in one cell.

The measurement pattern could also be predefined.

Embodiments of the present application allow hybrid automatic repeat request (HARQ) process to be performed across cells. Specifically, after the network device has received information of data reception situation of the N cell(s) included by the virtual cell fed back by the terminal, it re-transmit data to the terminal according to the information of data reception situation, where the re-transmitted data is transmitted among the N cell(s) by time-division multiplexing.

For example, after the network device has received a nacknowledge (NACK) feedback information with respect to LTE-U1 cell of the virtual cell from the terminal, LTE-U2 cell currently in the virtual cell is transmitting downlink data to the terminal, so the network device could re-transmit data whose reception hasn't been acknowledged when transmitted in the LTE-U1 cell to the terminal via the LTE-U2 cell. If the first re-transmission still fails, re-transmissions could be performed multiple times. According to configuration information of time-division multiplexing of the virtual cell, the re-transmission of the data whose reception hasn't been acknowledged could happen in different cells, that is, the re-transmitted data could be transmitted among the N cell(s) by time-division multiplexing.

Embodiments of the present application allows a physical downlink control channel (PDCCH) to perform scheduling of a physical downlink shared channel (PDSCH) on a same carrier or cross carriers.

Specifically, the network device transmits a PDCCH in all or part of the cells in the virtual cell, where the PDCCH is configured to schedule resources transmitted in the cell and indicate the position of the PDSCH of the cell. The network device could also transmit a PDCCH in a cell which is not included by the virtual cell, where the PDCCH is configured to schedule resources transmitted in one or multiple cells of the virtual cell, and indicate the transmitting position of the PDSCH in one or multiple cells of the virtual cell.

In an optional embodiment, the network device and the terminal maintain a set of uplink and downlink timing relationship information of the virtual cell, where the uplink and downlink timing relationship information is configured to indicate the configuration of uplink and downlink subframes, which applies to each cell of the virtual cell. Correspondingly, in step 402, the network device transmits data with the terminal among the N cell(s) by time-division multiplexing, according to the maintained set of uplink and downlink timing relationship information of the virtual cell.

With regard to power control, in embodiments of the present application, the network device could perform power control based on the virtual cell, or perform power control based on each cell of the virtual cell.

If the network device performs power control based on the virtual cell, the terminal could perform power headroom report (PHR) based on the virtual cell. Correspondingly, the network device could receive the power headroom reported by the terminal according to power control parameter of the virtual cell, and perform power control on each cell of the virtual cell according to the power headroom. If the network device performs power control based on each cell of the virtual cell, the terminal could report the power headroom based on each cell of the virtual cell. Correspondingly, the network device could receive the power headroom of each cell reported by the terminal according to power control parameter of each cell in the virtual cell, and performs power control on each cell according to the power headroom of each cell.

In another embodiment of the present application, the network device could activate or deactivate the virtual cell, or perform discontinuous reception-on (DRX-on) or discontinuous reception-off (DRX-off) control.

Specifically, the network device could send to the terminal an indication about deactivation or DRX-off of the virtual cell, to instruct the terminal to stop data transmission among N cell(s) of the virtual cell by time-division multiplexing. Network device could also transmit an indication about the re-activation or DRX-on of the virtual cell to the terminal, to instruct the terminal to continue to transmit data among N cell(s) of the virtual cell by time-division multiplexing, where the configuration information of time-division multiplexing (e.g. the TDM pattern) used by the terminal when transmitting data among N cell(s) of the virtual cell by time-division multiplexing could either be the same as the configuration information of time-division multiplexing used before the virtual cell was deactivated or before the discontinuous reception of the virtual cell was off, or be another configuration information of time-division multiplexing configured separately.

Moreover, when the virtual cell is deactivated or the discontinuous reception of the virtual cell is off, the measurement pattern used by the terminal when perform cell measurement on the virtual cell could be configured by the network device for the terminal separately, so that the measurement patterns used when the virtual cell is activated or deactivated could be different, or the measurement patterns used in cases of DRX-on or DRX-off could be different. Of course previous measurement pattern could continue to be used, that is, the measurement pattern used when the virtual cell is activated or in the case of DRX-on could be used.

In embodiments of the present application, a network work device configures virtual cell for a terminal, where the virtual cell includes N cell(s), and N≥1; and the network device transmits data to the terminal among the N cell(s) by time-division multiplexing. Embodiments of the present application are able to flexibly adjust transmission carriers for UE services, avoiding interference among different frequency domains without affecting the UE service transmission, so as to improve the system transmission efficiency.

Figure 6:
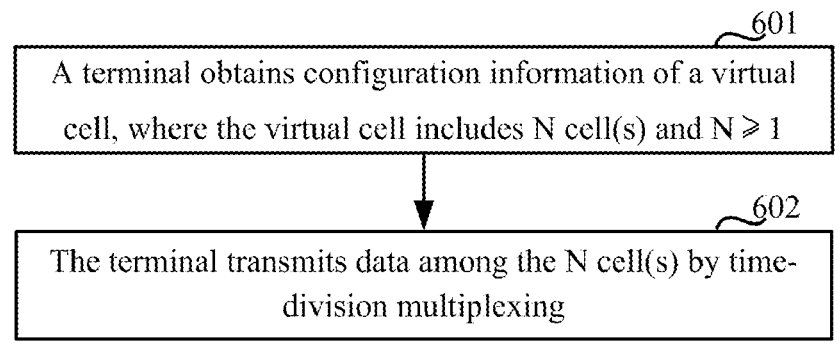
FIG. 6 is a flow chart of data transmission at the terminal side according to embodiments of the application.

FIG. 6 is a flow chart of data transmission according to embodiments of the present application, which illustrates the processing flow at the terminal side and includes step 601 and step 602.

Step 601: a terminal obtains configuration information of virtual cell, where the virtual cell includes N cell(s) and N≥1.

Step 602: the terminal transmits data by time-division multiplexing among the N cell(s).

To enable data transmission by time-division multiplexing among the N cell(s) included by the virtual cell between the network device and the terminal, the terminal needs to obtain the configuration information of time-division multiplexing, therefore, embodiments of the present application provides two methods (method 1 and method 2).

Method 1: static obtaining method, corresponding to the static notification method of the network device described above.

With this method, the terminal receives the configuration information of time-division multiplexing, where the configuration information of time-division multiplexing indicates time segment each cell occupies when the terminal transmits data in the N cell(s), where the terminal is instructed to transmit data in only one of the N cell(s), in order to realize transmission by time-division multiplexing between the network device and the terminal among the N cell(s).

Method 2: dynamic obtaining method, corresponding to the dynamic notification method of the network device described above.

With this method, the terminal receives cell handover indication information from the network device, and switches from a source cell which it is currently operating in to a target cell which the cell handover indication information indicates to transmit data, according to the cell handover indication information, where the source cell and the target cell are both cells of the N cell(s).

Moreover, the terminal maintains a set of uplink and downlink timing relationship information of the virtual cell, where the uplink and downlink timing relationship information is configured to indicate the configuration of uplink and downlink sub-frames and applies to every cell of the virtual cell. Correspondingly, in the step 602, after the terminal has obtained the configuration information of time-division multiplexing, it transmits data with the network device among the N cell(s) by time-division multiplexing according to the uplink and downlink timing relationship information.

Embodiments of the present application allow an HARQ process to be performed across cells. Specifically, after the terminal feeds back information of data reception situation of the N cell(s) included in the virtual cell to the network device, it receives data re-transmitted by the network device according to the information of data reception situation, where the re-transmitted data is transmitted among the N cell(s) by time-division multiplexing. For the implementation of how the network device re-transmits data to the terminal, please refer to the abovementioned embodiments, and it wouldn't be discussed repeatedly herein.

Embodiments of the present application allow a PDCCH performs PDSCH scheduling on a same carrier or cross carriers.

Specifically, the terminal detects a PDCCH in each of the N cell(s), and detects a PDSCH in the present cell according to detected PDCCH, where the PDCCH of each of the N cell(s) is configured to schedule resources transmitted in the cell. Or, the terminal detects a PDCCH in a cell not included in the virtual cell, and detects a PDSCH in one or multiple cells of the N cell(s) according to detected PDCCH, where the PDCCH in a cell not included in the virtual cell is configured to schedule resources transmitted in one or multiple cells of the virtual cell and the cell not included in the virtual cell could be the primary cell of carrier aggregation or a non-virtual cell.

With regard to power control, in embodiments of the present application, the terminal could perform power control based on the virtual cell, or perform power control based on each cell of the virtual cell.

The terminal could perform power measurement on the virtual cell according to power control parameter(s) configured for the virtual cell, and perform power headroom report for the virtual cell according to the power measurement result; or the terminal could perform power measurement on the N cell(s) according to power control parameter(s) respectively configured for the N cell(s) of the virtual cell and perform power headroom report for the N cell(s) according to the power measurement results.

In addition, the terminal obtains a measurement pattern configured for the terminal by the network device, which indicates a time segment that the measurement of each cell of the virtual cell occupies. The measurement and a time-division multiplexing pattern could be the same or different, and if they are the same, the terminal could perform measurement on the current service reception cell.

The measurement pattern could be configured to instruct the terminal to perform measurement on multiple cells of the virtual cell, and even instruct the terminal to perform measurement on all cells of the virtual cell, which applies to a scenario where the terminal has a large enough operating bandwidth. The measurement pattern could also be configured to instruct to perform measurement among multiple cells of the virtual cell by time-division multiplexing, where the measured time segments of the respective cells don't overlap with each other, that is, at one moment only one cell is measured, which applies to a scenario where the terminal could only work in one cell.

The measurement pattern could also be predefined.

Moreover, after the terminal obtains a measurement result by measurement, measurement report is reported for each of the N cell(s).

In embodiments of the present application, when the virtual cell configured for the terminal is deactivated or when the discontinuous reception of the virtual cell configured for the terminal is off, the terminal stop transmitting data among the N cell(s) by time-division multiplexing; when the virtual cell configured for the terminal is re-activated or the discontinuous reception of the virtual cell configured for the terminal is on, the terminal continues to transmit data among the N cell(s) by time-division multiplexing. The configuration information of time-division multiplexing (e.g. the TDM pattern) used by the terminal when it transmits data among the N cell(s) of the virtual cell(s) by time-division multiplexing could either be the same as the configuration information of time-division multiplexing used before the virtual cell(s) was deactivated or the discontinuous reception of the virtual cell(s) was off, or be another configuration information of time-division multiplexing configured separately.

Moreover, when the virtual cell is deactivated or the discontinuous reception of the virtual cell(s) is off, the measurement pattern used by the terminal when perform cell measurement on the virtual cell(s), could be configured by the network device for the terminal separately, so that the measurement patterns used when the virtual cell is activated or deactivated could be different, or the measurement patterns used in cases of DRX-on or DRX-off could be different. Of course previous measurement pattern could continue to be used, that is, the measurement pattern used when the virtual cell(s) is activated or when its discontinuous reception is on could be used.

In embodiments of the present application, a terminal obtains configuration information of virtual cell, where the virtual cell includes N cell(s), and N≥1; the terminal transmits data among the N cell(s) by time-division multiplexing. Embodiments of the present application are able to flexibly adjust a UE service transmission carrier, avoiding interference among different frequency domains without affecting the UE service transmission, so as to improve the system transmission efficiency.

To make the purpose, the technical solution and the beneficial effect of the present application clearer, the present application will be described in further detail with reference to the overall process of the method described herein. It is to be understood that the specific embodiments described herein are merely illustrative of the present application and are not intended to limit the present application.

Embodiment 1 of the present application: the situation where FDD carrier(s) is used for constructing a virtual cell.

A network device configures configuration information of carrier aggregation for a terminal, which includes configuration information of a primary cell and configuration information of a virtual cell, where the primary cell is an FDD cell, the virtual cell includes three FDD cells operating at unlicensed bands which are named LTE-U Cell-1, LTE-U Cell-2, and LTE-U Cell-3.

The terminal maintains an HARQ entity for the primary cell and the secondary cell, respectively. Uplink transmission is performed in the primary cell, while downlink transmission is performed in the primary cell and the virtual cell. At one moment the terminal could perform downlink service reception in the virtual cell through only one cell of LTE-U Cell-1, LTE-U Cell-2 and LTE-U Cell-3.

The network device could configure operating mode in the virtual cell (i.e. configuration information of time-division multiplexing) for the terminal through radio resource control protocol (RRC) signaling at the same time, that is, the terminal performs service reception through which cell of the three LTE-U cells. For example, sub-frames 0, 1 and 2 are configured to receive downlink data in the LTE-U Cell-1, sub-frames 3, 4 and 5 are configured to receive downlink data in LTE-U Cell-2, sub-frames 6, 7 and 8 are configured to receive downlink data in LTE-U Cell-3 and sub-frame 9 is not needed to configured to receive any downlink data. The configuration information of time-division multiplexing could be configured by the network device through the RRC signaling, or the network device could transmit cell handover indication information according to interference of different LTE-U Cell, to instruct the terminal to switch from the source cell where it is currently operating in to the target cell the cell handover indication information indicates to transmit data, where the source cell and the target cell are both cells of the N cells.

The terminal receives downlink data in each of the LTE-U cells according to the configuration information of time-division multiplexing configured by the network device, and the scheduling signaling of the downlink data may come from a same LTE-U Cell or PCell.

The terminal transmits data among the three LTE-U cells by time-division multiplexing and according to uplink and downlink timing relationship information configured for the virtual cell.

The terminal feeds back to the network device information of data reception situation of one of the three LTE-U cells, such as LTE-U Cell-1; and the network device re-transmits data to the terminal according to the information of data reception situation, where the re-transmitted data could be transmitted in LTE-U Cell1, LTE-U Cell-2 or LTE-U Cell-3.

The terminal detects a PDCCH in each of the three LTE-U cells, and detects the a PDSCH in the same cell according to detected PDCCH, where the PDCCH in each of the three LTE-U cells is configured to schedule resource transmitted in the cell; or, the terminal detects the PDCCH in a cell outside the virtual cell according to detected PDCCH, and detects the PDSCH in one or multiple cells of the three LTE-U cells, and the PDCCH in the cell outside the virtual cell is configured to schedule resource transmitted in one or multiple cells of the virtual cell.

The terminal performs power measurement on the virtual cell according to a power control parameter configured for the virtual cell, and performs the power headroom report for the virtual cell according to the power measurement's result; or, the terminal performs power measurement on the three LTE-U cells, respectively, according to the power control parameters respectively configured for the three LTE-U cells and performs power headroom report for the three LTE-U cells, respectively, according to the power measurement's results.

If the terminal has an operating bandwidth which is large enough, then the terminal could perform measurement on the three LTE-U cells included in the virtual cell at the same time; and if the terminal could only work in one of the LTE-U cells, which means the terminal could perform measurement on only one LTE-U cell in one time segment, then the terminal could perform measurement on the three LTE-U cells included in the virtual cell by time-division multiplexing. After the terminal has obtained the measurement's results, it reports the measurement results with respect to each LTE-U cell in the virtual cell.

The network device could change the configuration information of the virtual cell dynamically via RRC signaling, according to the changes of measurement results or interference of different LTE-U cells, such as deleting LTE-U Cell-1 or adding LTE-U Cell-4.

When the virtual cell configured for the terminal is deactivated or its discontinuous reception is off, the terminal stops transmitting data among the three LTE-U cells by time-division multiplexing, and when the virtual cell is deactivated, the measurement configuration of the terminal could be explicitly reconfigured by network.

When the virtual cell configured for the terminal is activated again or its discontinuous reception is on, the terminal continues to transmit data among the three LTE-U cells by time-division multiplexing.

Embodiment 2 of the present application: the situation where TDD carrier(s) is used for constructing a virtual cell.

A network device configures configuration information of carrier aggregation for a terminal, which includes configuration information of a primary cell and configuration information of a virtual cell, where the primary cell is a TDD or FDD cell, and the virtual cell includes three TDD cells operating at unlicensed bands, respectively named LTE-U Cell-1, LTE-U Cell-2 and LTE-U Cell-3.

The network device could configure the virtual cell only for performing downlink transmissions, or the network device could configure the virtual cell for performing both uplink and downlink transmissions.

(1) When the network device configures the virtual cell to only perform downlink transmissions, the specific situation of data transmission is as follows.

The terminal maintains an HARQ entity for each of the primary cell and the secondary cell. Uplink transmission is performed in the primary cell while downlink transmission is performed in the primary cell and the virtual cell. At one moment the terminal could perform downlink service reception in the virtual cell through only one cell of LTE-U Cell-1, LTE-U Cell-2 and LTE-U Cell-3.

The network device could configure operating mode in the virtual cell (i.e. configuration information of time-division multiplexing) for the terminal through RRC signaling at the same time, that is, the terminal performs service reception through which cell of the three LTE-U cells. For example, sub-frames 0, 1 and 2 are configured to receive downlink data in LTE-U Cell-1, sub-frames 3, 4 and 5 are configured to receive downlink data in LTE-U Cell-2, sub-frames 6, 7 and 8 are configured to receive downlink data in LTE-U Cell-3 and sub-frame 9 is not needed to be configured to receive any downlink data. The configuration information of time-division multiplexing could be configured by the network device through the RRC signaling, or the network device could transmit cell handover indication information to the terminal, according to interference of different LTE-U cells, to instruct the terminal to switch from the source cell where it is currently operating in to the target cell the cell handover indication information indicates to transmit data, where the source cell and the target cell are both cells of the N cell(s).

The terminal receives downlink data in each of the LTE-U cells according to the configuration information of time-division multiplexing configured by the network device, and the scheduling signaling of the downlink data may come from a same LTE-U Cell or PCell.

The terminal transmits data among the three LTE-U cells by time-division multiplexing and according to uplink and downlink timing relationship information configured for the virtual cell.

The terminal feeds back to the network device information of data reception situation of one of the three LTE-U cells, such as LTE-U Cell-1; and the network device re-transmits data to the terminal according to the information of data reception situation, where the re-transmitted data could be transmitted in LTE-U Cell1, LTE-U Cell-2 or LTE-U Cell-3.

The terminal detects the PDCCH in each of the three LTE-U cells, and detects the PDSCH in the same cell according to detected PDCCH, where the PDCCH in each of the three LTE-U cells is configured to schedule resource transmitted in the cell; or, the terminal detects the PDCCH in a cell outside the virtual cell, and detects the PDSCH in one or multiple cells of the three LTE-U cells according to detected PDCCH, where the PDCCH in the cell outside the virtual cell is configured to schedule resource transmitted in one or multiple cells of the virtual cell.

The terminal performs power measurement on the virtual cell according to a power control parameter configured for the virtual cell, and performs power headroom report of the virtual cell according to the power measurement's result; or, the terminal performs power measurement on the three LTE-U cells, respectively, according to the power control parameters respectively configured for the three LTE-U cells in the virtual cell and performs power headroom reports of the three LTE-U cells, respectively, according to the power measurement's results.

If the terminal has an operating bandwidth which is large enough, then the terminal could perform measurement on the three LTE-U cells included in the virtual cell at the same time; and if the terminal could only work in one of the LTE-U cells, which means the terminal could perform measurement on only one LTE-U cell in every time segment, then the terminal could perform measurement on the three LTE-U cells included in the virtual cell by time-division multiplexing. After the terminal has obtained the measurement's results, it reports the measurement results with respect to each LTE-U cell in the virtual cell.

The network device could change the configuration information of the virtual cell dynamically via RRC signaling, according to the changes of measurement results or interference of different LTE-U cells, such as deleting LTE-U Cell-1 or adding LTE-U Cell-4.

When the virtual cell configured for the terminal is deactivated or its discontinuous reception is off, the terminal stops transmitting data among the three LTE-U cells by time-division multiplexing, and when the virtual cell is deactivated, the measurement configuration of the terminal could be explicitly reconfigured by network.

When the virtual cell configured for the terminal is activated again or its discontinuous reception is on, the terminal continues to transmit data among the three LTE-U cells by time-division multiplexing.

(2) When the network device configures the virtual cell to perform uplink and downlink transmissions, the specific situation of data transmission is as follows.

The terminal maintains an HARQ entity for each of the primary cell and the secondary cell. Uplink and downlink transmissions are performed in the primary cell and/or in the virtual cell. At one moment the terminal could perform data transmission in the virtual cell through only one cell of LTE-U Cell-1, LTE-U Cell-2 and LTE-U Cell-3.

The network device could configure operating mode in the virtual cell (i.e. configuration information of time-division multiplexing) for the terminal through RRC signaling at the same time, that is, the terminal performs data transmission through which cell of the three LTE-U cells. For example, sub-frames 0, 1 and 2 are configured to transmit data in LTE-U Cell-1, sub-frames 3, 4 and 5 are configured to transmit data in LTE-U Cell-2, sub-frames 6, 7 and 8 are configured to transmit data in LTE-U Cell-3 and sub-frame 9 is not needed to be configured to transmit any data. The configuration information of time-division multiplexing could be configured by the network device through the RRC signaling, or the network device could transmit cell handover indication information to the terminal, according to interference of different LTE-U cells, to instruct the terminal to switch from the source cell where it is currently operating in to the target cell the cell handover indication information indicates to transmit data, where the source cell and the target cell are both cells of the N cell(s).

The terminal maintains information of only one timing relationship of the virtual cell, i.e., the uplink and downlink timing relationship information of LTE-U Cell-1 also applies to LTE-U Cell-2 and LTE-U Cell-3. The terminal transmits data among the three LTE-U cells by time-division multiplexing and according to the uplink and downlink timing relationship information of the virtual cell.

The terminal feeds back to the network device information of data reception situation of one of the three LTE-U cells, such as LTE-U Cell-1; and the network device re-transmits data to the terminal according to the information of data reception situation, where the re-transmitted data could be transmitted in LTE-U Cell1, LTE-U Cell-2 or LTE-U Cell-3.

The terminal detects the PDCCH in each of the three LTE-U cells, and detects the PDSCH in the same cell according to detected PDCCH, where the PDCCH in each of the three LTE-U cells is configured to schedule resource transmitted in the cell; or, the terminal detects the PDCCH in a cell outside the virtual cell, and detects the PDSCH in one or multiple cells of the three LTE-U cells according to detected PDCCH, where the PDCCH in the cell outside the virtual cell is configured to schedule resource transmitted in one or multiple cells of the virtual cell.

The terminal performs power measurement on the virtual cell according to a power control parameter configured for the virtual cell, and performs power headroom report for the virtual cell according to the power measurement's result; or, the terminal performs power measurement on the three LTE-U cells, respectively, according to the power control parameters respectively configured for the three LTE-U cells in the virtual cell and performs the power headroom reports for the three LTE-U cells, respectively, according to the power measurement's results.

If the terminal has an operating bandwidth which is large enough, then the terminal could perform measurement on the three LTE-U cells included in the virtual cell at the same time; and if the terminal could only work in one of the LTE-U cells, which means the terminal could perform measurement on only one LTE-U cell in every time segment, then the terminal could perform measurement on the three LTE-U cells included in the virtual cell by time-division multiplexing. After the terminal has obtained the measurement's results, it reports the measurement results with respect to each LTE-U cell in the virtual cell.

The network device could change the configuration information of the virtual cell dynamically via RRC signaling, according to the changes of measurement results or interference of different LTE-U cells, such as deleting LTE-U Cell-1 or adding LTE-U Cell-4.

When the virtual cell configured for the terminal is deactivated or its discontinuous reception is off, the terminal stops transmitting data among the three LTE-U cells by time-division multiplexing, and when the virtual cell is deactivated, the measurement configuration of the terminal could be explicitly reconfigured by network.

When the virtual cell configured for the terminal is activated again or its discontinuous reception is on, the terminal continues to transmit data among the three LTE-U cells by time-division multiplexing.

With respect to the method processes described above, embodiments of the present application further provides a terminal, where the implementation of the terminal is similar to the methods above, and will not be discussed here anymore.

Figure 7:
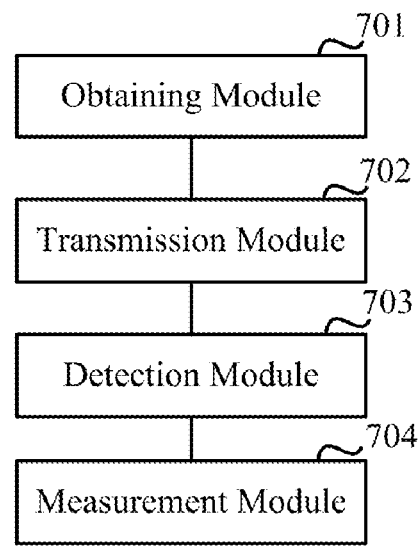
FIG. 7 is a schematic diagram of a terminal according to embodiments of the application.

FIG. 7 is a schematic diagram of a terminal according to embodiments of the present application, where the terminal includes:

an obtaining module 701, configured to obtain configuration information of a virtual cell, where the virtual cell includes N cell(s), N≥1; and a transmission module 702, configured to transmit data by time-division multiplexing among the N cell(s).

Preferably, the transmission module 702 is further configured to:

receive configuration information of time-division multiplexing, where the configuration information of time-division multiplexing indicates time segment(s) each cell occupies when the terminal transmits data among the N cell(s), and in each time segment the terminal is instructed to transmit data in only one of the N cell(s).

Preferably, the transmission module 702 is further configured to:

receive cell handover indication information sent by a network device; and switch from a source cell which the terminal is currently operating in to a target cell indicated by the cell handover indication information to transmit data, according to the cell handover indication information, where the source cell and the target cell are cells of the N cells.

Preferably, the transmission module 702 is further configured to:

maintain a set of uplink and downlink timing relationship information of the virtual cell; and transmit data by time-division multiplexing and according to the uplink and downlink timing relationship information among the N cell(s).

Preferably, the transmission module 702 is further configured to:

feed back information of data reception situation in the N cell(s) to the network device; and receive data resent by the network device according to the information of data reception situation, where the resent data is transmitted among the N cell(s) by time-division multiplexing.

Preferably, the terminal further includes:

a detection module 703, configured to detect a PDCCH in each of the N cell(s), and detect a PDSCH in the same cell according to detected PDCCH, where the PDCCH in each of the N cell(s) is configured to schedule the resource transmitted in the cell; or detect the PDCCH in a cell outside the virtual cell, and detect the PDSCH in one or multiple cells of the N cell(s) according to detected PDCCH, where the PDCCH in a cell outside the virtual cell is configured to schedule the resource transmitted in one or multiple cells of the virtual cell.

Preferably, the terminal further includes:

a measurement module 704, configured to perform power measurement on the virtual cell according to power control parameter configured for the virtual cell and perform power headroom report for the virtual cell according to the power measurement's result; or perform power measurement on each of the N cell(s) respectively, according to power control parameter(s) respectively configured for each of the N cell(s) of the virtual cell, and perform power headroom report for each of the N cell(s) according to the power measurement results, respectively.

Preferably, the terminal further includes:

a measurement module 704, configured to perform measurement on the N cell(s) included in the virtual cell at the same time; or perform measurement on the N cell(s) included in the virtual cell by time-division multiplexing, where measurement is performed on only one of the N cell(s) in every time segment.

Preferably, the transmission module 702 is further configured to:

report the measurement result of each of the N cell(s).

Preferably, the transmission module 702 is further configured to:

when the virtual cell configured for the terminal is deactivated or its discontinuous reception is off, stop transmitting data among the N cell(s) by time-division multiplexing; and when the virtual cell configured for the terminal is activated again or its discontinuous reception is on, continue to transmit data among the N cell(s) by time-division multiplexing.

Preferably, there is one or multiple virtual cells; and when there are multiple virtual cells, a cell is allowed to be configured into multiple virtual cells, and its configurations for time-division multiplexing in the multiple virtual cells keep the same.

Preferably, the obtaining module 701 is further configured to:

obtain configuration information of carrier aggregation configured for the terminal, where the configuration information of carrier aggregation includes configuration information of primary cell and configuration information of secondary cell, the configuration information of secondary cell includes configuration information of at least one virtual cell, and the virtual cell includes N cell(s) operating at non-licensed band(s).

With respect to the method processes described above, embodiments of the present application further provides a network device, where the implementation of the network device is similar to the methods above, and will not be discussed here anymore.

Figure 8:
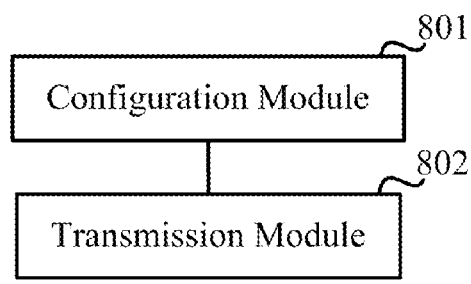
FIG. 8 is a schematic diagram of a network device according to embodiments of the application.

FIG. 8 is a schematic diagram of a network device according to embodiments of the present application, where the network device includes:

a configuration module 801, configured to configure virtual cell for a terminal, where the virtual cell includes N cell(s), and N≥1; and a transmission module 802, configured to transmit data with the terminal by time-division multiplexing among the N cell(s) included in the virtual cell.

Preferably, the transmission module 802 is further configured to:

transmit to the terminal configuration information of time-division multiplexing, where the configuration information of time-division multiplexing indicates time segment each cell occupies when the terminal transmits data among the N cell(s), and in each time segment the terminal is instructed to transmit data in only one of the N cell(s).

Preferably, the transmission module 802 is further configured to:

transmit cell handover indication information to the terminal, so that the terminal, according to the cell handover indication information, switches from a source cell it is currently operating in to a target cell indicated by the cell handover indication information to transmit data, where the source cell and the target cell are cells of the N cells.

Preferably, the transmission module 802 is further configured to:

transmit data with the terminal by time-division multiplexing among the N cell(s) according to a set of uplink and downlink timing relationship information of the virtual cell maintained by the terminal.

Preferably, the transmission module 802 is further configured to:

receive information of data reception situation in the N cell(s) fed back by the terminal; and re-transmit data to the terminal according to the information of data reception situation, where the re-transmitted data is transmitted among the N cell(s) by time-division multiplexing.

Preferably, the transmission module 802 is further configured to:

receive power headroom reported by the terminal according to power control parameter(s) of the virtual cell, and perform power control on each cell included in the virtual cell according to the power headroom; or receive a power headroom of each cell reported by the terminal according to power control parameter(s) of each cell included in the virtual cell, and perform power control on each cell according to the cell's power headroom.

Preferably, the transmission module 802 is further configured to:

receive measurement result of each of the N cell(s) reported by the terminal;

where the measurement results are obtained by the terminal performing measurement on the N cells included in the virtual cell at the same time; or the measurement results are obtained by the terminal performing measurement on the N cells included in the virtual cell through time-division multiplexing.

Preferably, the transmission module 802 is further configured to:

transmit to the terminal an indication of deactivation or discontinuous reception-off (DRX off) of the virtual cell to instruct the terminal to stop transmitting data by time-division multiplexing among the N cells; and transmit to the terminal an indication of re-activation or discontinuous reception-on (DRX on) of the virtual cell to instruct the terminal to continue to transmit data among the N cell(s) by time-division multiplexing.

Preferably, there is one or multiple virtual cells; and when there are multiple virtual cells, a cell is allowed to be configured into multiple virtual cells, and its configurations for time-division multiplexing in the multiple virtual cells keep the same.

The configuration module 801 is further configured to:

configure configuration information of carrier aggregation for the terminal, where the configuration information of carrier aggregation includes configuration information of primary cell and configuration information of secondary cell, the configuration information of secondary cell includes configuration information of at least one virtual cell, and the virtual cell includes N cell(s) operating at non-licensed band(s).

Figure 9:
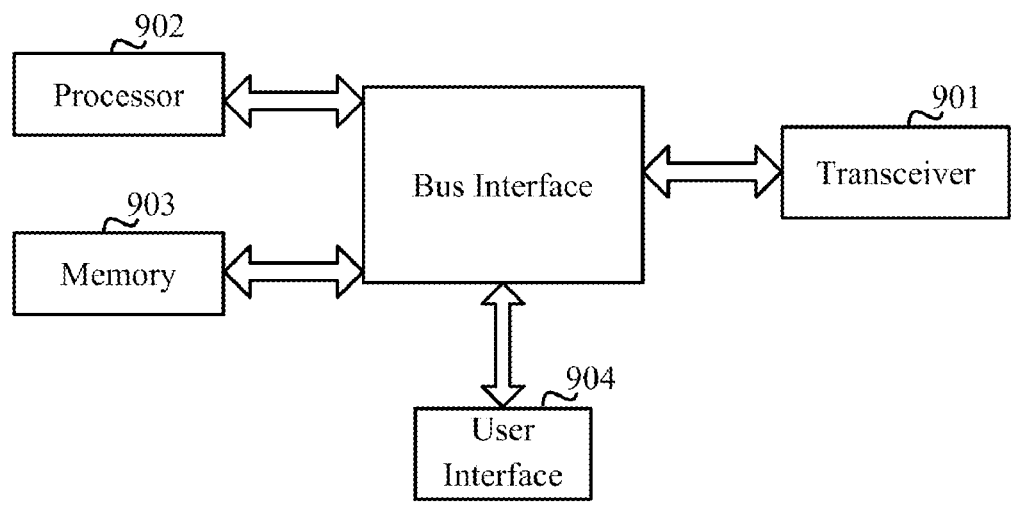
FIG. 9 is a schematic diagram of another terminal according to embodiments of the application.

FIG. 9 is a schematic diagram of another terminal according to embodiments of the present application, where the terminal includes a transceiver 901, and at least one processor 902 connected with the transceiver 901, where the processor 902 is configured to read instructions in a memory 903 to perform the following operations:

obtaining configuration information of a virtual cell, where the virtual cell includes N cell(s), N≥1; and controlling the transceiver 901 to transmit data by time-division multiplexing among the N cell(s).

In FIG. 9, the bus architecture may include any number of interconnected buses and bridges, specifically connected by a variety of circuits including one or multiple processors represented by the processor 902 and a memory represented by the memory 903. The bus architecture may also link various other circuits, such as peripherals, regulators, power management circuits, and the like, which are well known in the art and are not further described herein. The bus interface provides an interface. The transceiver 901 may be a plurality of elements, i.e., it may include a transmitter and a receiver, providing means for communicating with various other devices on the transmission medium. For a different user device, the user interface 904 may also be an interface capable of external access to a device that includes, but is not limited to, a keypad, a display, a speaker, a microphone, or a joystick.

The processor 902 is responsible for managing the bus architecture and usual processing, and the memory 903 may store the data used by the processor 902 when performing operations.

Preferably, the transceiver 901 is further configured to:

receive configuration information of time-division multiplexing, where the configuration information of time-division multiplexing indicates time segment each cell occupies when the terminal transmits data among the N cell(s), and in each time segment the terminal is instructed to transmit data in only one of the N cell(s).

Preferably, the transceiver 901 is further configured to receive cell handover indication information sent by a network device; and the processer 902 is further configured to perform the following operation: switching from a source cell which the terminal is currently operating in to a target cell indicated by the cell handover indication information to transmit data, according to the cell handover indication information, where the source cell and the target cell are cells of the N cells.

Preferably, the processor 902 is further configured to perform the following operations:

maintaining a set of uplink and downlink timing relationship information of the virtual cell; and controlling the transceiver 901 to transmit data by time-division multiplexing and according to the uplink and downlink timing relationship information among the N cell(s).

Preferably, the processor 902 is further configured to perform the following operation:

controlling the transceiver 901 to feed back information of data reception situation in the N cell(s) to the network device.

The transceiver 901 is further configured to receive data resent by the network device according to the information of data reception situation, where the resent data is transmitted among the N cell(s) by time-division multiplexing.

Preferably, the processor 902 is further configured to perform the following operations:

detecting a PDCCH in each of the N cell(s), and detecting a PDSCH in the same cell according to detected PDCCH, where the PDCCH in each of the N cell(s) is configured to schedule the resource(s) transmitted in the cell; or detecting the PDCCH in a cell outside the virtual cell, and detecting the PDSCH in one or multiple cells of the N cell(s) according to detected PDCCH, where the PDCCH in a cell outside the virtual cell is configured to schedule the resource(s) transmitted in one or multiple cells of the virtual cell.

Preferably, the processor 902 is further configured to perform the following operations:

performing power measurement on the virtual cell according to power control parameter(s) configured for the virtual cell and performing power headroom report for the virtual cell according to the power measurement's result(s); or performing power measurement on each of the N cell(s) respectively, according to power control parameter(s) respectively configured for each of the N cell(s) of the virtual cell, and performing power headroom report for each of the N cell(s) according to the power measurement results, respectively.

Preferably, the processor 902 is further configured to perform the following operation:

performing measurement on the N cell(s) included in the virtual cell at the same time; or performing measurement on the N cell(s) included in the virtual cell by time-division multiplexing, where measurement is performed on only one of the N cell(s) in every time segment.

Preferably, the processor 902 is further configured to perform the following operation:

after having obtained the measurement result(s), controlling the transceiver 901 to report the measurement result of each of the N cell(s).

Preferably, the processor 902 is further configured to perform the following operations:

when the virtual cell configured for the terminal is deactivated or its discontinuous reception is off, controlling the transceiver 901 to stop transmitting data among the N cell(s) by time-division multiplexing; and when the virtual cell configured for the terminal is activated again or its discontinuous reception is on, controlling the transceiver 901 to continue to transmit data among the N cell(s) by time-division multiplexing.

Preferably, there is one or multiple virtual cells; and when there are multiple virtual cells, a cell is allowed to be configured into multiple virtual cells, and its configurations for time-division multiplexing in the multiple virtual cells keep the same.

Based on any of the abovementioned embodiments, the processor 902 is further configured to perform the following operation:

obtaining configuration information of carrier aggregation configured for the terminal, where the configuration information of carrier aggregation includes configuration information of primary cell and configuration information of secondary cell, the configuration information of secondary cell includes configuration information of at least one virtual cell, and the virtual cell includes N cell(s) operating at non-licensed band(s).

Figure 10:
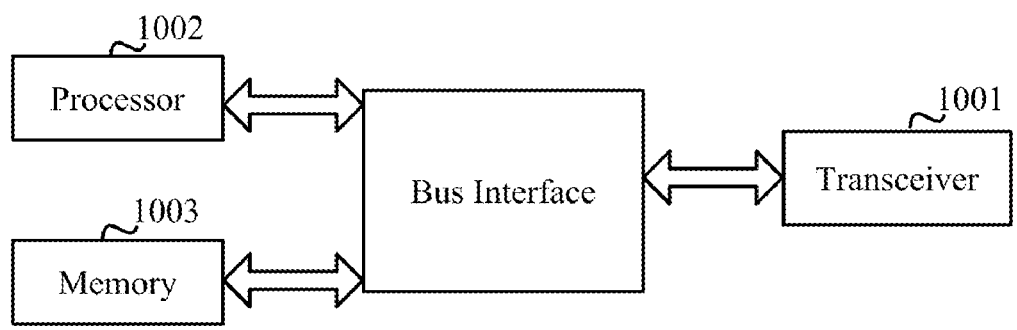
FIG. 10 is a schematic diagram of another network device according to embodiments of the application.

FIG. 10 is a schematic diagram of another network device according to embodiments of the present application, where the network device includes a transceiver 1001, and at least one processor 1002 connected with the transceiver 1001, where the processor 1002 is configured to read instructions in a memory 1003 and perform the following operations:

configuring a virtual cell for a terminal, where the virtual cell includes N cell(s), and N and controlling the transceiver 1001 to transmit data with the terminal by time-division multiplexing among the N cell(s) included in the virtual cell.

In FIG. 10, the bus architecture may include any number of interconnected buses and bridges, specifically connected by a variety of circuits including one or multiple processors represented by the processor 1002 and a memory represented by the memory 1003. The bus architecture may also link various other circuits, such as peripherals, regulators, power management circuits, and the like, which are well known in the art and are not further described herein. The bus interface provides an interface. The transceiver 1001 may be a plurality of elements, i.e., it may include a transmitter and a receiver, providing means for communicating with various other devices on the transmission medium.

The processor 1002 is responsible for managing the bus architecture and usual processing, and the memory 1003 may store the data used by the processor 1002 when performing operations.

Preferably, the processor 1002 is further configured to perform the following operation:

controlling the transceiver 1001 to transmit to the terminal configuration information of time-division multiplexing, where the configuration information of time-division multiplexing indicates time segment each cell occupies when the terminal transmits data among the N cell(s), and in each time segment the terminal is instructed to transmit data in only one of the N cell(s).

Preferably, the processor 1002 is further configured to perform the following operation:

controlling the transceiver 1001 to transmit cell handover indication information to the terminal, so that the terminal, according to the cell handover indication information, switches from a source cell it is currently operating in to a target cell indicated by the cell handover indication information to transmit data, where the source cell and the target cell are cells of the N cells.

Preferably, the processor 1002 is further configured to perform the following operation:

controlling the transceiver 1001 to transmit data with the terminal by time-division multiplexing among the N cell(s) according to a set of uplink and downlink timing relationship information of the virtual cell maintained by the terminal.

Preferably, the transceiver 1001 is further configured to receive information of data reception situation in the N cell(s) fed back by the terminal; and the processor 1002 is further configured to perform the following operation: re-transmitting data to the terminal according to the information of data reception situation, where the re-transmitted data is transmitted among the N cell(s) by time-division multiplexing.

Preferably, the transceiver 1001 is further configured to receive power headroom reported by the terminal according to power control parameter(s) of the virtual cell and the processor 1002 is further configured to perform the following operation: performing power control on each cell included in the virtual cell according to the power headroom; or, the transceiver 1001 is further configured to receive a power headroom of each cell reported by the terminal according to power control parameter(s) of each cell included in the virtual cell, and the processor 1002 is further configured to perform the following operation: performing power control on each cell according to the cell's power headroom.

Preferably, the transceiver 1001 is further configured to:

receive measurement result of each of the N cell(s) reported by the terminal;

where the measurement results are obtained by the terminal performing measurement on the N cells included in the virtual cell at the same time; or the measurement results are obtained by the terminal performing measurement on the N cells included in the virtual cell through time-division multiplexing.

Preferably, the processor 1002 is further configured to perform the following operations:

controlling the transceiver 1001 to transmit to the terminal an indication of deactivation or discontinuous reception-off (DRX off) of the virtual cell to instruct the terminal to stop transmitting data by time-division multiplexing among the N cells; and controlling the transceiver 1001 to transmit to the terminal an indication of re-activation or discontinuous reception-on (DRX on) of the virtual cell(s) to instruct the terminal to continue to transmit data among the N cell(s) by time-division multiplexing.

Preferably, there is one or multiple virtual cells; and when there are multiple virtual cells, a cell is allowed to be configured into multiple virtual cells, and its configurations for time-division multiplexing in the multiple virtual cells keep the same.

Based on any one of the abovementioned embodiments, the processor 1002 is further configured to perform the following operation:

configuring configuration information of carrier aggregation for the terminal, where the configuration information of carrier aggregation includes configuration information of primary cell and configuration information of secondary cell, the configuration information of secondary cell includes configuration information of at least one virtual cell, and the virtual cell includes N cell(s) operating at non-licensed band(s).

It can be seen from what is described above that, according to the embodiments of the present application, a terminal obtains configuration information for configuring a virtual cell for the terminal, where the virtual cell includes N cell(s), and N≥1; and the terminal transmits data among the N cell(s) by time-division multiplexing. The embodiments of the present application are able to flexibly adjust transmission carriers for UE services, avoiding interference among different frequency domains without affecting the UE service transmission, so as to improve the system transmission efficiency.

Those skilled in the art should understand that, the embodiments of the present application could be provided as a method, a system or a computer program product. Therefore, the application could adopt the forms of a complete hardware embodiment, a complete software embodiment or an embodiment combining both software and hardware. Moreover, the present application could take the form of a computer program product which could be implemented on one or more computer usable storage media (including but not limited to disk storage, a CD-ROM, or an optical memory, etc.) including computer executable instructions.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the embodiments of the application have been described, those skilled in the art benefiting from the underlying inventive concept can make additional modifications and variations to these embodiments. Therefore the appended claims are intended to be construed as encompassing the embodiments and all the modifications and variations coming into the scope of the application.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

The invention claimed is:

1. A data transmission method, the method comprising:
   obtaining, by a terminal, the configuration information of a virtual cell, wherein the virtual cell comprises N cells, and N≤1, wherein the N cells comprise cells operating at licensed bands and cells operating at unlicensed bands;
   transmitting, by the terminal, data by time-division multiplexing among the N cells;
   wherein the method further comprises:
   receiving, by the terminal, configuration information of time-division multiplexing, wherein the configuration information of time-division multiplexing indicates time segment each cell occupies when the terminal transmits data among the N cells, and in each time segment the terminal is instructed to transmit data in only one of the N cells;
   transmitting, by the terminal, data by time-division multiplexing among the N cells, comprises:
   transmitting, by the terminal, data by time-division multiplexing among the N cells according to the configuration information of time-division multiplexing.

2. The method according to claim 1, wherein the method further comprises:
   maintaining, by the terminal, a set of uplink and downlink timing relationship information of the virtual cell;
   transmitting, by the terminal, data by time-division multiplexing among the N cells, comprises:
   transmitting, by the terminal, data by time-division multiplexing and according to the uplink and downlink timing relationship information among the N cells;
   and/or
   the method further comprises:
   feeding back, by the terminal, information of data reception situation in the N cells to the network device; and
   receiving, by the terminal, data resent by the network device according to the information of data reception situation, wherein the resent data is transmitted among the N cells by time-division multiplexing.

3. The method according to claim 1, wherein the method further comprises:
   detecting, by the terminal, a physical downlink control channel (PDCCH) in each of the N cells, and detecting a physical downlink shared channel (PDSCH) in the same cell according to detected PDCCH, wherein the PDCCH in each of the N cells is configured to schedule resource transmitted in the cell; or
   detecting, by the terminal, the PDCCH in a cell outside the virtual cells, and detecting the PDSCH in one or multiple cells of the N cells according to detected PDCCH, wherein the PDCCH in a cell outside the virtual cells is configured to schedule the resource transmitted in one or multiple cells of the virtual cells.

4. The method according to claim 1, wherein the method further comprises:
performing, by the terminal, power measurement on the virtual cell according to a power control parameter configured for the virtual cell and performing power headroom report (PHR) for the virtual cell according to the power measurement result; or
performing, by the terminal, power measurement on each of the N cells respectively, according to a power control parameter respectively configured for each of the N cells of the virtual cell, and performing PHR for each of the N cells according to the power measurement results, respectively.

5. The method according to claim 1, wherein the method further comprises:
performing, by the terminal, measurement on the N cells comprised in the virtual cell at the same time; or
performing, by the terminal, measurement on the N cells comprised in the virtual cell by time-division multiplexing, wherein measurement is performed on only one of the N cells in every time segment;
wherein the method further comprises:
after having obtained the measurement result via the measurement, reporting, by the terminal, the measurement result of each of the N cells.

6. The method according to claim 1, wherein the method further comprises:
when the virtual cell configured for the terminal is deactivated or its discontinuous reception is off, stopping, by the terminal, transmitting data among the N cells by time-division multiplexing; and
when the virtual cell configured for the terminal is activated again or its discontinuous reception is on, continuing to transmit, by the terminal, data among the N cells by time-division multiplexing.

7. A data transmission method, the method comprising:
configuring, by a network device, a virtual cell for a terminal, wherein the virtual cell comprises N cells, and N≤1, wherein the N cells comprise cells operating at licensed bands and cells operating at unlicensed bands;
transmitting, by the network device, data with the terminal by time-division multiplexing among the N cells comprised in the virtual cell;
wherein the method further comprises: transmitting, by the network device, to the terminal configuration information of time-division multiplexing, wherein the configuration information of time-division multiplexing indicates time segment each cell occupies when the terminal transmits data among the N cells, and in each time segment the terminal is instructed to transmit data in one of the N cells;
transmitting, by the network device, data with the terminal by time-division multiplexing among the N cells comprised in the virtual cell, comprises:
transmitting, by the network device, according to the configuration information of time-division multiplexing, data with the terminal by time-division multiplexing among the N cells.

8. The method according to claim 7, wherein transmitting, by the network device, data with the terminal by time-division multiplexing among the N cells comprised in the virtual cell, comprises:
transmitting, by the network device, data with the terminal by time-division multiplexing among the N cells according to a set of uplink and downlink timing relationship information of the virtual cell maintained by the network device;
wherein the method further comprises:
receiving, by the network device, information of data reception situation in the N cells fed back by the terminal; and
re-transmitting, by the network device, data to the terminal according to the information of data reception situation, wherein the re-transmitted data is transmitted among the N cells by time-division multiplexing.

9. The method according to claim 7, wherein transmitting, by the network device, data with the terminal by time-division multiplexing among the N cells comprised in the virtual cell, comprises:
transmitting, by the network device, cell handover indication information to the terminal, so that the terminal, according to the cell handover indication information, switches from a source cell which the terminal is currently operating in to a target cell indicated by the cell handover indication information to transmit data, wherein the source cell and the target cell are cells of the N cells.

10. The method according to claim 7, wherein the method further comprises:
receiving, by the network device, power headroom reported by the terminal according to a power control parameter of the virtual cell, and performing power control on each cell comprised in the virtual cell according to the power headroom; or
receiving, by the network device, power headroom of each cell reported by the terminal according to a power control parameter of each cell comprised in the virtual cell, and performing power control on each cell according to the cell's power headroom.

11. The method according to claim 7, wherein the method further comprises:
transmitting, by the network device, to the terminal an indication of deactivation or discontinuous reception-off (DRX off) of the virtual cell to instruct the terminal to stop transmitting data by time-division multiplexing among the N cells; and
transmitting, by the network device, to the terminal an indication of re-activation or discontinuous reception-on (DRX on) of the virtual cell to instruct the terminal to continue to transmit data among the N cell(s) by time-division multiplexing.

12. A terminal, the terminal comprising:
an obtaining module, configured to obtain configuration information of a virtual cell, wherein the virtual cell comprises N cells, N≤1, wherein the N cells comprise cells operating at licensed bands and cells operating at unlicensed bands; and
a transmission module, configured to transmit data by time-division multiplexing among the N cells;
wherein the transmission module is further configured to:
receive configuration information of time-division multiplexing, wherein the configuration information of time-division multiplexing indicates time segment each cell occupies when the terminal transmits data among the N cells, and in each time segment the terminal is instructed to transmit data in one of the N cells; and
transmit data by time-division multiplexing among the N cells according to the configuration information of time-division multiplexing.

13. The terminal according to claim 12, wherein the transmission module is further configured to:
maintain a set of uplink and downlink timing relationship information of the virtual cell; and transmit data by time-division multiplexing and according to the uplink and downlink timing relationship information among the N cells;
and/or
the transmission module is further configured to:
feed back information of data reception situation in the N cells to the network device; and
receive data resent by the network device according to the information of data reception situation, wherein the resent data is transmitted among the N cells by time-division multiplexing.

14. The terminal according to claim 12, wherein the transmission module is further configured to:
receive cell handover indication information sent by a network device; and
switch from a source cell which the terminal is currently operating in to a target cell indicated by the cell handover indication information to transmit data, according to the cell handover indication information, wherein the source cell and the target cell are cells of the N cells.

15. The terminal according to claim 12, wherein the terminal further comprises:
a detection module, configured to detect a PDCCH in each of the N cells, and detect a PDSCH in a same cell according to detected PDCCH, wherein the PDCCH in each of the N cells is configured to schedule the resource transmitted in the cell; or
detect the PDCCH in a cell outside the virtual cells, and detect the PDSCH in one or multiple cells of the N cells according to detected PDCCH, wherein the PDCCH in a cell outside the virtual cells is configured to schedule the resource transmitted in one or multiple cells of the virtual cell.

16. The terminal according to claim 12, further comprising:
a measurement module, configured to perform power measurement on the virtual cell according to a power control parameter configured for the virtual cell and perform PHR of the virtual cell according to the power measurement result; or
perform power measurement on each of the N cells respectively, according to a power control parameter respectively configured for each of the N cells of the virtual cell, and perform PHR of each of the N cells according to the power measurement result, respectively;
the terminal further comprising:
a measurement module, configured to perform measurement on the N cells comprised in the virtual cell at the same time; or
perform measurement on the N cells comprised in the virtual cell by time-division multiplexing, wherein measurement is performed on one of the N cells in every time segment.

17. The terminal according to claim 16, wherein the transmission module is further configured to:
report the measurement result of each of the N cells.

18. The terminal according to claim 12, wherein the transmission module is further configured to:
when the virtual cell configured for the terminal is deactivated or its discontinuous reception is off, stop transmitting data among the N cells by time-division multiplexing; and
when the virtual cell configured for the terminal is activated again or its discontinuous reception is on, continue to transmit data among the N cells by time-division multiplexing.

19. The terminal according to claim 12, wherein there is one or multiple virtual cells; and
when there are multiple virtual cells, a cell is allowed to be configured into multiple virtual cells, and its configurations for time-division multiplexing in the multiple virtual cells are the same.

20. The terminal according to claim 12, wherein the obtaining module is further configured to:
obtain configuration information of carrier aggregation configured for the terminal, wherein the configuration information of carrier aggregation comprises configuration information of primary cell and configuration information of secondary cell, the configuration information of secondary cell comprises configuration information of at least one virtual cell, and the virtual cell comprises N cells operating at non-licensed band in a case of obtaining configuration information of carrier aggregation configured for the terminal.

* * * * *